United States Patent [19]

Tate

[11] Patent Number: 5,159,525
[45] Date of Patent: Oct. 27, 1992

[54] PRESSURE SENSOR

[75] Inventor: Kikuo Tate, Kawasaki, Japan

[73] Assignee: Fuji Koki Manufacturing Co., Ltd., Tokyo, Japan

[21] Appl. No.: 737,025

[22] Filed: Jul. 29, 1991

[51] Int. Cl.⁵ .............................................. H01G 7/00
[52] U.S. Cl. ...................................... 361/283; 73/718
[58] Field of Search .................... 73/718, 724; 361/283

[56] References Cited

U.S. PATENT DOCUMENTS 4,716,492  12/1987  Charboneau et al. ............... 361/283
4,875,135  10/1989  Bishop et al. ........................ 361/283

Primary Examiner—Donald A. Griffin
Attorney, Agent, or Firm—Kenyon & Kenyon

[57] ABSTRACT

A pressure sensor comprises a housing having a pressurized fluid inlet, and a supporting member installed in an inner space of the housing and having one end surface of the pressurized fluid inlet side, the other end surface opposite to the one end surface, and a connection port opened at the one end surface and the other end surface. A pressure sensitive element is supported on the one end surface of the supporting member in the inner space of the housing to partition the inner space of the housing into a pressure sensitive chamber communicating with the pressurized fluid inlet and a sealing chamber isolated from the pressurized fluid inlet. An electric circuit module is supported on the other end surface of the supporting member in the inner space of the housing and is electrically connected to the pressure sensitive element through the connection port of the supporting member. And, an external connection terminal is supported on the peripheral wall of the housing to protrude from the inner space of the housing to the outer space, and is electrically connected to the electric circuit module.

7 Claims, 4 Drawing Sheets

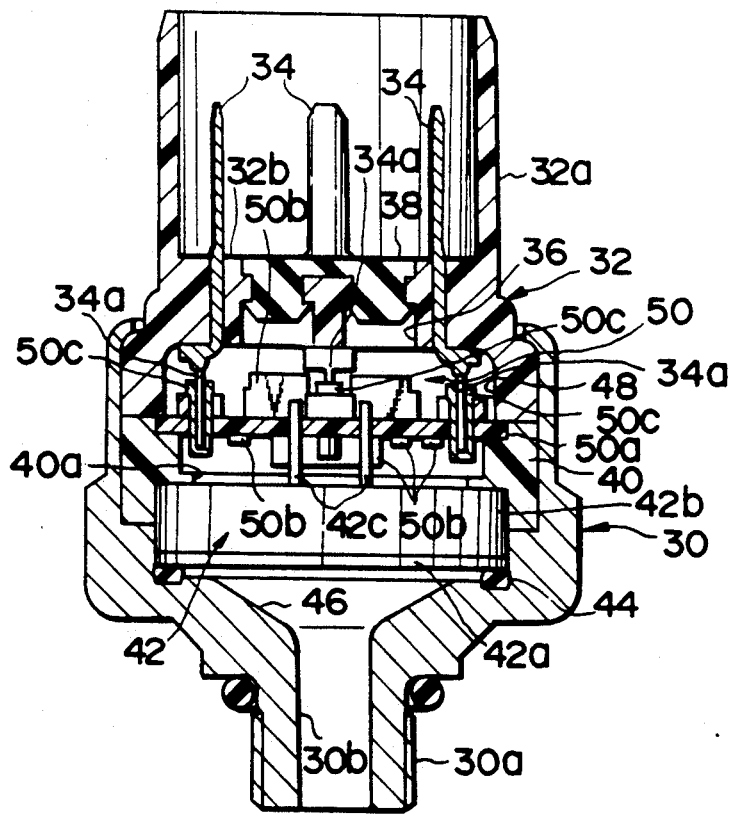
F I G. 4
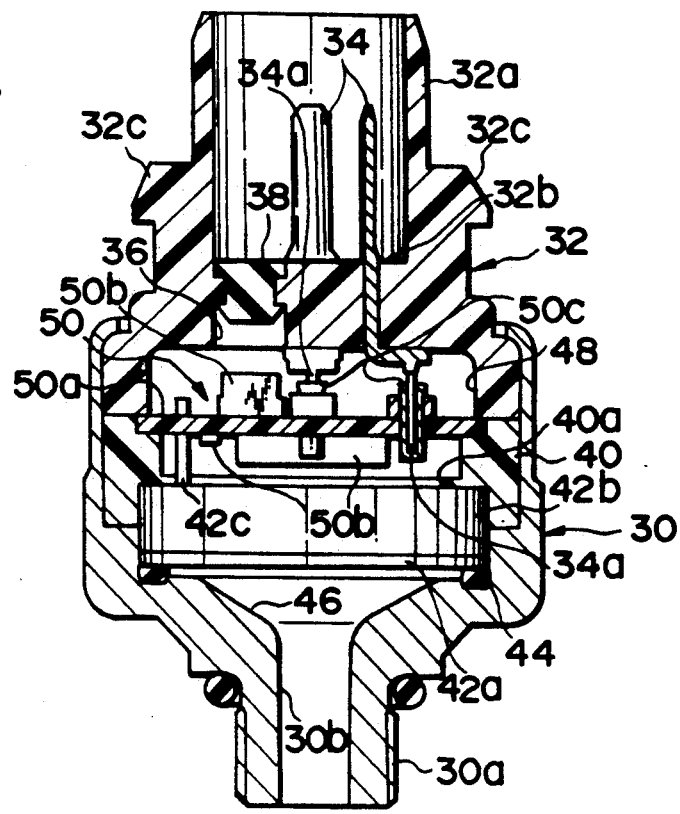
F I G. 5

PRESSURE SENSOR

BACKGROUND OF THE INVENTION

1. Field of the Invention

The present invention relates to a pressure sensor.

2. Description of the Related Art

A pressure sensor using a capacitive pressure transducer is known as disclosed, for example, in U.S. Pat. No. 4,875,135. The pressure sensor of this type is employed, for example, in a cooler for automobiles.

The pressure sensor of the above-described U.S. Patent has, as shown in FIGS. 1A and 1B, a metal main housing member 10 screwed at its one end with a refrigerant pipe in the cooler to communicate with refrigerant in the refrigerant pipe, and a non-electrically conductive material connector housing member 12 coupled to the other end portion of the main housing member 10 by bending the distal end of the other end portion to engage with the connector housing member 12.

The main housing member 10 has a coupling portion 10a having a communication hole on the inner periphery of which female threads are formed, and a trough-shaped portion 10b fixed at its bottom wall to one end of the coupling portion 10a. At the bottom wall of the trough-shaped portion 10b, a punched portion punched toward the communication hole of the coupling portion 10a is formed. The side surfaces of the punched portion are sheared off from the bottom wall of the trough-shaped portion 10b to communicate the communication hole with the inner space of the trough-shaped portion 10b. A capacitive pressure transducer 16 placed on the bottom wall of the trough-shaped portion 10b through an annular sealing ring 14 is disposed in the inner space of the trough-shaped portion 10b, and the capacitive pressure transducer 16 is pressed on the sealing ring 14 by the inner end of the connector housing member 12 coupled to the main housing member 10.

The connector housing member 12 has a cylindrical shape the outer end of which is closed by a partition wall 12a from an outer space, and the base ends of a plurality of connector terminals 18 are fixed to the partition wall 12a so that they extend in a longitudinal direction of the connector housing member 12. At the partition wall 12a of the connector housing member 12, a cylindrical terminal protection cover 12b extending in the longitudinal direction is formed to surround the plurality of connector terminals 18 and to protect the plurality of connector terminals 18 against an external force and an outer environment.

A sealing space 20 is constructed by a region between the partition wall 12a and the capacitive pressure transducer 16 in the inner space of the connector housing 12, and a flexible board 22 is contained in the sealing space 20 in a folded state. Various electronic parts 22a for constructing a predetermined electric circuit are mounted on one surface of the flexible board 22, and they are located inside of the folded flexible board 22. The upper half portion of the flexible board 22 is structurally and electrically fixed to the base end portions of the plurality of connector terminals 18, and the lower half portion of the flexible board 22 is structurally and electrically fixed to a plurality of terminals (not shown) on the upper surface of the capacitive pressure transducer 16.

The above-described pressure sensor has a calibration opening 24 at the peripheral wall of the mainhousing side end portion of the connector housing 12. The calibration opening 24 communicates the sealing space 20 with the outer space to be used to calibrate the predetermined electric circuit on the flexible board 22 for the capacitive pressure transducer 16 from the outer space side in the final step of a production line of the pressure sensor. The calibration opening 24 is sealed, after the calibration work is finished, by a viscous rubber-like sealing material 26.

SUMMARY OF THE INVENTION

In the conventional pressure sensor constructed as described above, the flexible board 22 is supplied to a main production line of the pressure sensor in a state that one end portion of the flexible board 22 is fixed to the capacitive pressure transducer 16. The flexible board 22 is structurally and electrically fixed at its other end portion to the base end portions of a plurality of the connector terminals 18 already fixed to the connector housing 12 in the main production line. The fixing work of the other end portion of the flexible board 22 with the capacitive pressure transducer 16 to the plurality of connector terminals 18 is complicated since the capacitive pressure transducer 16 which has already fixed to one end portion of the flexible board 22 is swinged.

Accordingly, it is a main object of the present invention to provide a pressure sensor which can be readily assembled as compared with the above-described conventional example and can shorten its production time.

In order to achieve the above main object of the invention, a pressure sensor according to the present invention comprises a housing having a pressurized fluid inlet; a supporting member installed in an inner space of the housing and having one end surface of the pressurized fluid inlet side, the other end surface opposite to the one end surface, and a connection port opened at the one end surface and the other end surface; a pressure sensitive element supported on the one end surface of the supporting member in the inner space of the housing to partition the inner space of the housing into a pressure sensitive chamber communicating with the pressurized fluid inlet and a sealing chamber isolated from the pressurized fluid inlet; an electric circuit module supported on the other end surface of the supporting member in the inner space of the housing and electrically connected to the pressure sensitive element through the connection port of the supporting member; and an external connection terminal supported on the peripheral wall of the housing, protruded from the inner space of the housing to the outer space and electrically connected to the electric circuit module.

In the pressure sensor of the present invention constructed as described above, the supporting member, and the pressure sensitive element and the electric circuit module disposed on both side surfaces of the supporting member can be used as one assembling unit in the main production line of the pressure sensor, and a work for installing the assembling unit in the inner space of the housing is facilitated.

In the pressure sensor of the present invention, it is preferable that the electric circuit module and the external connection terminal are electrically connected with each other by detachable plug/socket electric connection means.

With the arrangement as described above, solder is not required for the electrical connection of the electric circuit module to the external connection terminal.

Therefore, the assembling work of the pressure sensor is facilitated more readily.

In the pressure sensor of the present invention, even if the electric circuit module and the external connection terminal are electrically connected with each other by contact touch type electric connection means using elasticity, the similar effect to that of the case of the above-described plug/socket electric connection means can be obtained.

In the pressure sensor of the present invention, it is preferable that the electric circuit module is constructed by a both-side printed circuit board in which electronic parts are mounted on both side surfaces of the circuit board, and the both-side printed circuit board is supported on the other end surface of the supporting member in a state that the electronic parts of one side surface of the circuit board are disposed in the connection port of the supporting member.

When the electric circuit module is constructed and disposed as described above, the electric circuit module can be supported in a compact state on the other end surface of the supporting member.

It is preferable in the pressure sensor of the present invention that the housing includes a main housing member having the pressurized fluid inlet, and a connector housing member attached to the main housing member and supporting the external connection terminal, and the supporting member, and the pressure sensitive element and the electric circuit module disposed on both side surfaces of the supporting member are held between the main housing member and the connector housing member.

With the arrangement as described above, steps for supporting the external connection terminal on the housing and for installing the supporting member supporting the pressure sensitive element and the electric circuit module on both side surfaces thereof in the housing can be facilitated.

In the pressure sensor of the present invention described above, it is preferable that a calibration opening, through which the pressure sensitive element of the electric circuit module is calibrated from a outside space, is provided in a region of the peripheral wall of the housing, the region being located in the vicinity of the external connection terminal and being covered by an outer coupler when the outer coupler is connected to the external connection terminal.

The arrangement of the calibration opening as described above prevent a sealing material filled in the calibration opening from being exposed directly in wrong environments such as a high temperature, a high moisture, a high vibration, oil, dusts, etc. in a engine room of an automobile when the pressure sensor of this invention is used in a cooler of the automobile, so that the sealing material is prevented from being deteriorated and hence the electric circuit module is prevented from being malfunctioned due to the deterioration of the sealing material.

It is preferable that the calibration opening is closed by a cap composed of a cured rubber-like material.

The above-described cap does not need time for harding as compared with the viscous sealing material filled in the calibration opening in the above-described conventional pressure sensor, thereby shortening production time in the production line.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a schematic longitudinal sectional view taken along the line 4—4 of FIG. 2;

FIG. 5 is a schematic longitudinal sectional view taken along the line 5—5 of FIG. 2;

DETAILED DESCRIPTION OF THE PREFERRED EMBODIMENTS

A pressure sensor according to an embodiment of the present invention will be described in detail with reference to FIGS. 2 to 5.

Figure 1A:
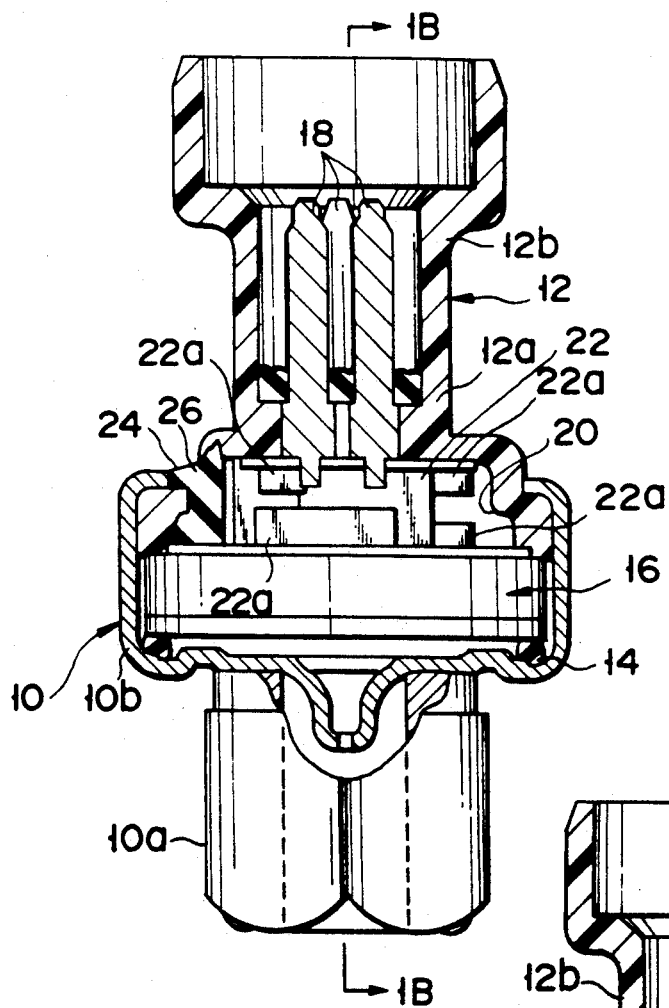
FIGS. 1A and 1B are different schematic longitudinal sectional views of a conventional pressure sensor used, for example, in a cooler for an automobile.
Figure 1B:
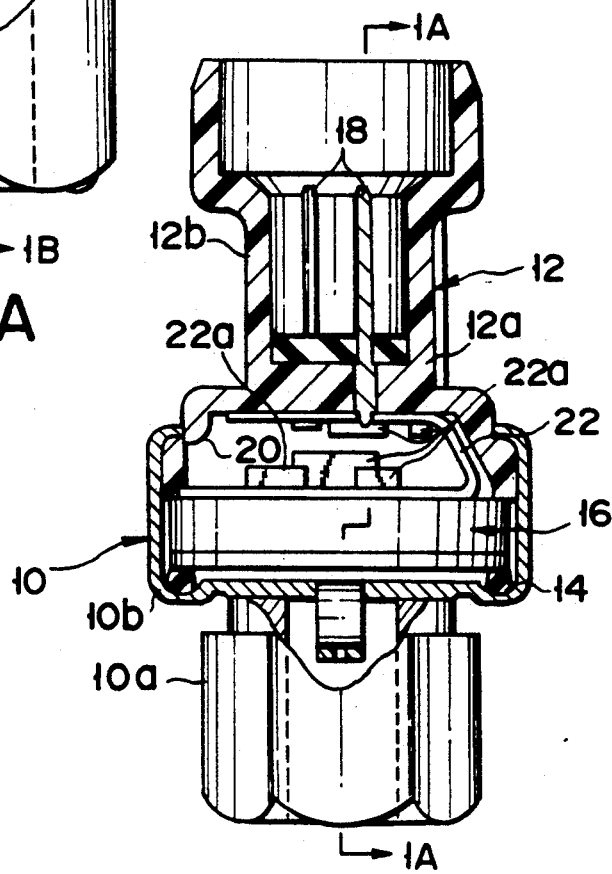
Figure 2:
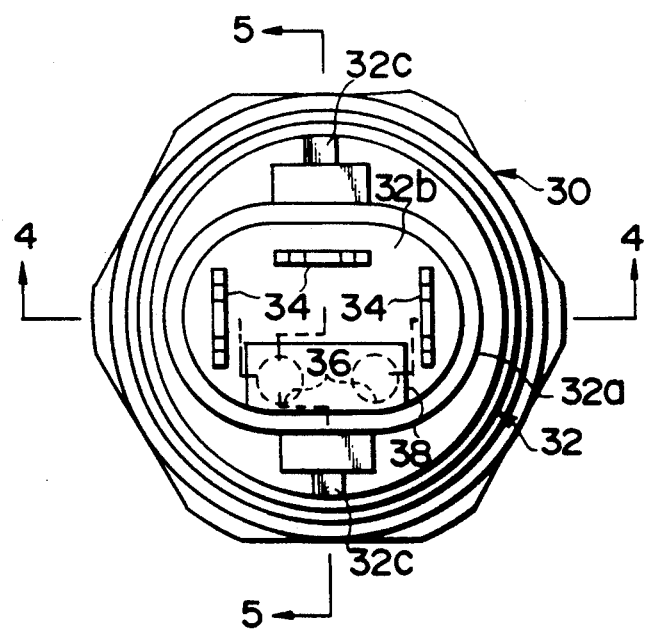
FIG. 2 is a schematic plan view of a pressure sensor according to an embodiment of the present invention.
Figure 3:
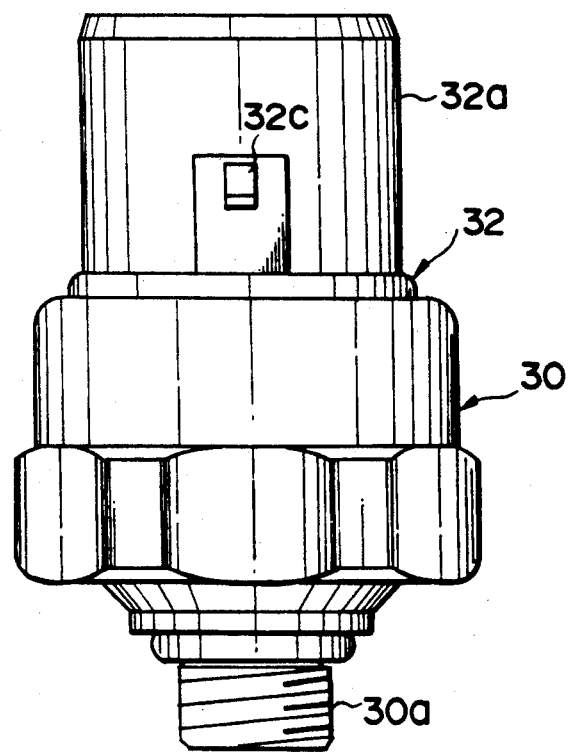
FIG. 3 is a schematic front view of the pressure sensor of FIG. 2.

This pressure sensor comprises, as shown in FIGS. 2 and 3, a metal main housing member 30 having a connecting protrusion 30a extended from one end portion of the housing 30 in a direction along a longitudinal center line thereof, and a connector housing member 32 attached to the other end portion of the main housing member 30 and having a cylindrical terminal protection cover 32a extended in a direction along a longitudinal center line thereof at the opposite side to the connecting protrusion 30a of the main housing 30. In this embodiment, an outer peripheral surface of the main housing member 30 is shaped like a nut, and the connector housing member 2 is formed of a strong and electrically insulating material such as, for example, glass fiber-reinforced polybutylene terephthalate, etc.

An inner space of the connector housing member 32 and an inner space of the terminal protection cover 32a are partitioned, as shown in FIG. 2, by a partition wall 2b, and a plurality of external connection terminals 34 extended in a direction along the longitudinal center line in the inner space of the terminal protection cover 32a are supported on the partition wall 32b. Calibration openings 36 opened in the inner space of the terminal protection cover 32a and the inner space of the connector housing member 32 are further formed in the partition wall 32b, and the calibration openings 36 are closed by a cap 38 formed of a cured rubber-like material.

The terminal protection cover 32a of the connector housing member 32 is also functioned as a guide member for an outer coupler (not shown) when the coupler is connected to the external connection terminals 34, and outer coupler removal preventive protrusions 32c are formed on the outer peripheral surface of the terminal protection cover 32a.

As shown in FIGS. 4 and 5, one end portion (inner end portion) of the connector housing member 32, located opposite side to the terminal protection cover 32a, is inserted into the opening at the other end portion of the inner space of the main housing member 30, and is fixed to the other end portion of the main housing member 30 by radially inwardly bending the distal end of the other end portion of the main housing member 30 to engage with the outer peripheral surface of the connector housing member 32. A pressurized fluid inlet 30b communicating the inner space of the main housing member 30 with the outer space is formed in the connecting protrusion 30a of one end portion of the main housing member 30.

In the inner space of the main housing member 30, an annular supporting member 40 is contained. The supporting member 40 is sandwiched between the end surface of the inner end portion of the connector housing member 32 and the bottom surface of the inner space of the main housing member 30. The supporting member 40 is formed of an electrically insulating material such as, for example, polybutylene terephthalate, etc., and supports a disc-shaped pressure sensitive element 42 in a supporting recess formed on the pressurized-fluid-inlet side end surface of the main housing member 30.

The pressure sensitive element 42 is pressed on the bottom surface of the inner space of the main housing member 30 through an annular gasket 44. The inner space of the main housing member 30 and the inner space of the inner end portion of the connector housing member 32 are partitioned by the gasket 44 into a pressure sensitive chamber 46 communicating with the outer space through the pressurized fluid inlet 30b of the main housing member 30 and a sealing chamber 48 isolated from the pressurized fluid inlet 30b.

In this embodiment, the pressure sensitive element 42 is constructed by a capacitive pressure transducer. The capacitive pressure transducer has a diaphragm 42a adjacent to the pressure sensitive chamber 46, and the diaphragm 42a is formed of a ceramic material such as, for example, alumina, etc. The capacitive pressure transducer further has a thick base member 42b disposed at the sealing-chamber side. The base member 42b and the diaphragm 42a are combined with each other in a state that they are isolated from each other at a predetermined distance, for example, through a glass seal to allow the deflection of the diaphragm 42a.

On the opposed surfaces (not shown) of the diaphragm 42a and the base member 42b, a predetermined metal pattern is formed to form a capacitor for varying an electrostatic capacity according to the dimensional change of the space between the two opposed surfaces of the diaphragm 42a and the base member 42b due to the deflection of the diaphragm 42a. The capacitive pressure transducer constructed as described above is known per se, and hence the detailed description of the inner structure thereof will be omitted.

A plurality of external connection terminals 42c of the above-described capacitor (not shown) are formed in a rod shape or an elongated plate shape protruded from the sealing-chamber side end surface of the base member 42b toward the sealing chamber 48 through the central connection port 40a of the supporting member 40.

The supporting member 40 supports an electric circuit module 50 in another supporting recess formed on the sealing-chamber side end surface of the supporting member 40. In this embodiment, the electric circuit module 50 has a both-side printed circuit board 50a formed of ceramic material having superior heat resistance and moisture resistance characteristics. Various electronic parts 50b are mounted on the both surfaces of the both-side printed circuit board 50a.

The various electronic parts 50b on the supporting member side surface of the both-side printed circuit board 50a are disposed in the connection port 40a of the supporting member 40, and the external connection terminals 42c of the pressure sensitive element 42 penetrate the both-side printed circuit board 50a at predetermined positions thereof, and electrically connect to a predetermined electric circuit formed on the both-side printed circuit board 50a. The predetermined electric circuit is composed to generate a predetermined pressure-change electric signal on a basis of the pressure of the pressurized fluid sensed in the pressure sensitive chamber 46 of the main housing member 30 by the pressure sensitive element 42. Since such a predetermined electric circuit is heretofore known, the detailed description of the circuit arrangement will be omitted.

At predetermined positions on the both-side printed circuit board 50a opposed to the base end portions of the plurality of external connection terminals 34 disposed at predetermined positions on the partition 20 wall 32b of the connector housing member 32, socket type electric connection terminals 50c are disposed. These socket type terminals 50c are opened toward the base end portions of the plurality of external connection terminals 34. And, pin type electric connection terminals 34a detachably inserted into the openings of the corresponding socket type electric connection terminals 50c are formed at the base end portions of the plurality of external connection terminals 34.

To the main production line of the pressure sensors according to the one embodiment of the present invention constructed as described above, each supporting member 40 is supplied in a state that the pressure sensitive element 42 and the electric circuit module 50 have been supported in the supporting recesses of the both end surfaces of the supporting member 40 and that both are electrically connected with each other. In the main production line, the supporting member 40 is inserted into the inner space of the main housing member 30 from the opening of the other end portion of the main housing member 30, and the pressure sensitive element 42 on the supporting member 40 is placed on the gasket 44 already supplied to the bottom surface of the inner space of the main housing member 30.

Then, the inner end portion of the connector housing member 32 on which the plurality of external connection terminals 34 are already mounted is inserted into the opening of the other end portion of the main housing member 30, and the pin type electric connection terminals 34a of the base end portions of the plurality of the external connection terminals 34 of the connector housing member 32 are inserted into the plurality of corresponding socket type electric connection terminals 50c of the electric circuit module 50 on the supporting member 40. Finally, the distal end of the other end portion of the main housing member 30 is bent radially inwardly to engage with the outer peripheral surface of the connector housing member 32, thereof fixing the main housing member 30 and the connector housing member 32 with each other. In this state, the gasket 44 is sandwiched between the bottom surface of the inner space of the main housing member 30 and the pressure sensitive element 42 on the supporting member 40, so that the inner space of the main housing member 30 and the inner space of the inner end portion of the connector housing member 32 are partitioned into the pressure sensitive chamber 46 communicating with the outer space through the pressurized fluid inlet 30b of the main housing member 30 and the sealing chamber 48 isolated from the pressurized fluid inlet 30b.

At the last of the production line, calibration of the predetermined electric circuit of the electric circuit module 50 to the pressure sensitive element 42 is conducted through the calibration openings 36 from the outer space side, and the calibration openings 36 are closed by the cap 38 after the calibration work is finished.

In the embodiment described above, since the pressure sensitive element 42 is constructed by the capacitive pressure transducer, the above-described calibration work must be conducted after the pressure sensitive element 42 is mounted in a predetermined state between the inner space of the main housing member 30 and the inner space of the connector housing member 32 so as to avoid influences of an external electric field and a floating capacity. In this embodiment, the calibration work is conducted by inserting a screwdriver (not shown) into the sealing chamber 48 through the calibration openings 36, and rotating regulating members (not shown) of predetermined electronic parts 50b such as, for example, two semifixed variable resistors disposed at the sealing-chamber side of the electric circuit module 50. It is necessary in the calibration work to regulate at least value of a reference point of a predetermined output voltage and that of a predetermined span thereof with respect to a predetermined pressure so as to determine the relationship between the pressure and the output voltage. While the calibration work is executed, pressurized fluid having predetermined pressure value must be fed into the pressure sensitive chamber 46 through the pressurized fluid inlet 30b and an outer coupler of a measuring instrument (not shown) must be electrically connected to the plurality of external connection terminals 44 of the connector housing member 32. Therefore, a special jig, connected simply and detachably to the pressurized fluid inlet 30b and feeding pressurized fluid having a predetermined pressure value, and a special outer coupler, allowing the insertion of a screwdriver (not shown) into the calibration openings 36 while the outer coupler is electrically connected to the plurality of external connection terminals 44 of the connector housing member 32, are prepared.

The electric circuit of the electric circuit module 50 can be constructed to electrically perform the abovedescribed calibration work. In this case, an electric contact probe is inserted into the sealing chamber 40 through the calibration opening 36 instead of inserting the screwdriver, and contacted with predetermined electronic terminals disposed in the sealing-chamber side of the electric circuit module 50.

It is further considered that the calibration opening 36 is formed in a suitable shape thereby allowing the trimming of the electric circuit by using a laser beam in the calibration work.

As apparent from the detailed foregoing description, the pressure sensor according to the embodiment of the present invention constructed as described above can be readily automatically assembled except the last calibration work of the production line.

The embodiment described above is illustrated and described for explaining the present invention, and the present invention is not limited to the particular embodiments. Various modifications and variations may be made within the spirit and scope of the present invention.

Figure 6:
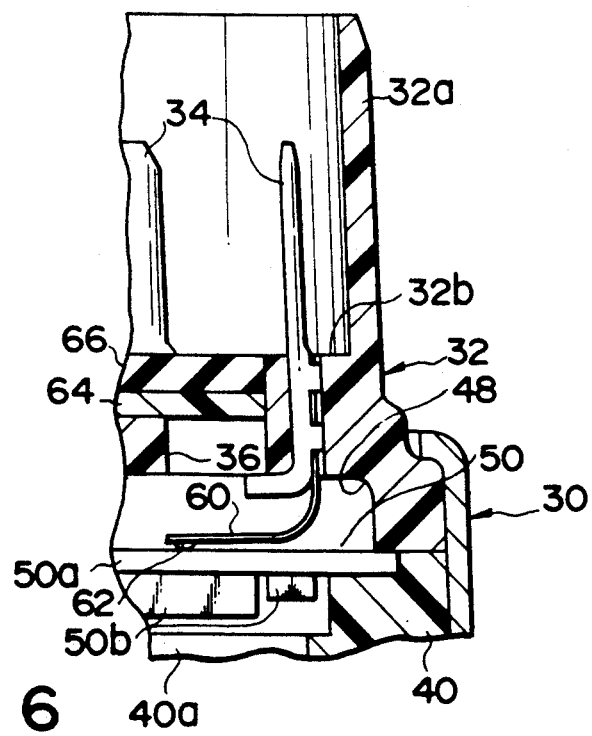
FIG. 6 is a schematic longitudinal sectional view of a main portion of a modification of the pressure sensor according to the above described one embodiment of the present invention.

For example, FIG. 6 shows a modification of the pressure sensor according to the above described embodiment of the present invention. In the modification, the same parts and components as those of the pressure sensor of the embodiment are denoted by the same reference numerals as used in the embodiment, and detailed description thereof will be omitted, and only the portions different from the embodiment will be described.

In this modification, socket type electric connection terminals are not disposed at predetermined positions on the both-side printed circuit board 50a of the electric circuit module 50, and pin type electric connection terminals are not formed in the base end portions of a plurality of external connection terminals 34. Instead of the socket type electric connection terminals, only contacts are printed at predetermined positions on the both-side printed circuit board 50a. At the base end portion of each of the external connection terminals 34, a contact plate 60 having elasticity and made of, for example, beryllium-copper alloy is secured, for example, by clamping it with the corresponding base end portion. The distal end portions of the contact plates 60 are bent along the upper surface of the both-side printed circuit board 50a, and contact terminal members 62 are secured to the printed-circuit-board side surfaces of the distal end portions of the contact plates 60.

When the inner end portion of the connector housing member 32 in which a plurality of external connection terminals 34 have been already mounted is inserted into the opening of the other end portion of the main housing member 30 in the above-described production line, the contact terminal members 62 of the distal end portions of the contact plates 60 are pressed on the corresponding contacts of the electric circuit module 50 on the supporting member 40 so that they are electrically connected with the corresponding contacts. In this modification, in order to securely electrically connect the contact terminal members 62 to the contacts, both of the plurality of contacts and the contact terminal members 62 are preferably gold-plated.

In the modification in FIG. 6, calibration openings 36 are closed by a cover 64, and then further sealed by a viscous rubber-like filling material 66.

Figure 7:
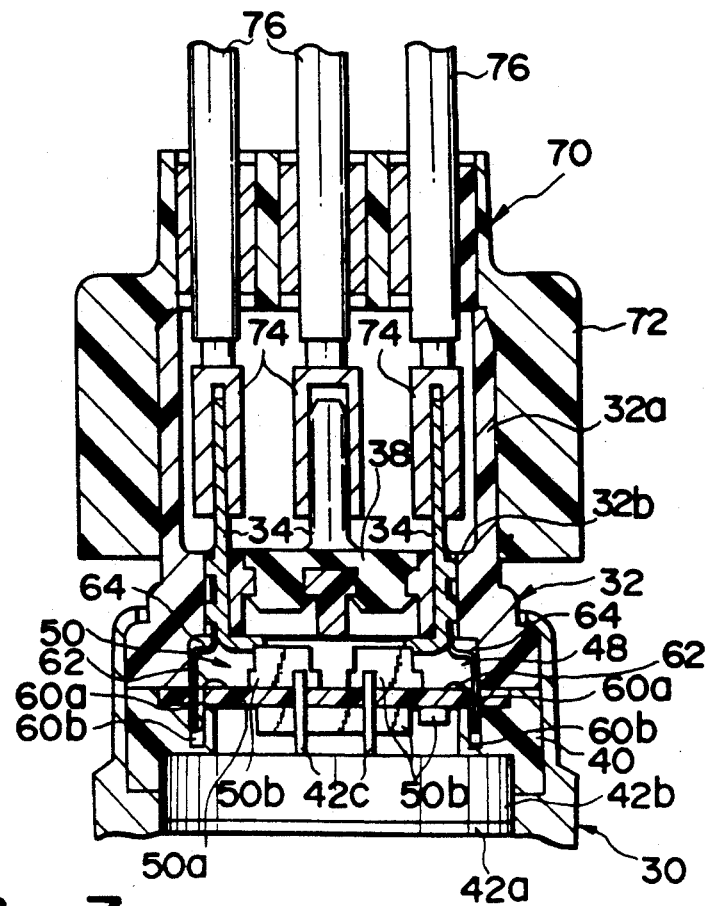
FIG. 7 is a schematic longitudinal sectional view showing a main portion of another modification of the pressure sensor according to the above described one embodiment of the present invention, wherein an outer coupler is detachably connected to a plurality of external connection terminals supported on a housing of the pressure sensor.

FIG. 7 shows another modification of the pressure sensor according to the above described embodiment of the present invention. In the another modification, the same parts and components as those of the pressure sensor of the embodiment are denoted by the same or equivalent reference numerals as used in the embodiment, and detailed descriptions thereof will be omitted. Only the portions different from those of the embodiment will be described.

In the another modification, socket type electric connection terminals are not disposed at predetermined positions on the both-side printed circuit board 50a of the electric circuit module 50, and pin type electric connection terminals are not formed at the base end portions of a plurality of external connection terminals 34. Instead of the socket type electric connection terminals, through holes 60a are formed at a plurality of predetermined positions in the both-side printed circuit board 50a, and holes 60b corresponding to the through holes 60a are formed in the bottom of the electric circuit module supporting recess of the supporting member 40. Terminal strips 62 made of an electrically conductive material electrically connected to a plurality of terminals on the both-side printed circuit board 50a are inserted into the through holes 60a in both-side printed circuit board 50a and the holes 60b in the supporting member 40. At the base end portion of each of the external connection terminals 34, a contact plate 64 having elasticity and made of, for example, berylliumcopper alloy is secured, for example, by clamping it with the corresponding base end portion. The distal end portion of the contact plate 64 is bent substantially in a U-shape.

When the inner end portion of the connector housing member 32 in which a plurality of external connection terminals 34 have been already mounted is inserted into the opening of the other end portion of the main housing member 30 in the above-described production line, the distal end portions of the contact plates 64 are inserted into the plurality of corresponding through holes 60a of the electric circuit module 50 and the holes 60b of the supporting member 40, and are pressed by the elastic force thereof on the terminal strips 62 extended from the both-side printed circuit board 50a in these through holes 60a and the holes 60b, and electrically connected thereto.

FIG. 7 shows an outer coupler 70 detachably connected to the connector housing member 32 of the pressure sensor and electrically connected to the external connection terminals 34. The outer coupler 70 has a coupler housing 72 made of a non-electrically conductive material, and the coupler housing 72 fits on the outer peripheral surface of the terminal protection cover 32a of the connector housing member 32. The coupler housing 72 is formed in a cylindrical shape having a bottom wall at its one end. A plurality of socket type electric connection terminals 74 are disposed in the inner space of the coupler housing 72, and a plurality of external connection terminals 34 in the inner space of the terminal protection cover 32a of the connector housing member 32 are inserted into the socket type electric connection terminals 74 when the coupler housing 72 is fitted on the outer peripheral surface of the terminal protection cover 32a of the connector housing member 32. The base end portions of the socket type electric connection terminals 74 are supported on the bottom wall of the coupler housing 72, and a plurality of lead wires 76 for electrically connecting the socket type electric connection terminals 74 to a predetermined electric equipment are extended out from the bottom wall.

FIG. 7 shows a state that the cap 38 for closing the calibration openings 36 opened in a region surrounded by the terminal protection cover 32a on the partition wall 32a of the connector housing member 32 is shut off from the outer space by the coupler housing 72 of the outer coupler 70. Thus, the cap 38 is not deteriorated while the pressure sensor is used in a cooler for an automobile and is exposed to wrong environments such as, for example, a high temperature, a high moisture, a high vibration, oil, dusts, etc., in the engine room of the automobile, so that the electric circuit is prevented from being malfunctioned due to the deterioration of the cap 38.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A pressure sensor comprising:
a housing having a pressurized fluid inlet;
a supporting member installed in an inner space of said housing and having one end surface of the pressurized fluid inlet side, the other end surface opposite to the one end surface, and a connection port opened at the one end surface and the other end surface, said supporting member having recesses formed at peripheral portions of the one and other surfaces, respectively, to surround the opening of the connection post at the one and the other end surfaces, respectively;
a pressure sensitive element supported on the recess in the one end surface of said supporting member in the inner space of said housing to partition the inner space of said housing into a pressurized sensitive chamber communicating with the pressurized fluid inlet and a sealing chamber isolated from the pressurized fluid inlet;
an electric circuit module supported on the recess in the other end surface of said supporting member in the inner space of said housing and electrically connected to said pressure sensitive element through the connection port of said supporting member;
an external connection terminal supported on the peripheral wall of said housing, and protruded from the inner space of said housing to the outer space, and
means for electrically connecting said external connection terminal to said electric circuit module when said supporting member engages with an inner end of said external connection terminal so that said electric circuit module on said supporting member and the inner end of said external connection terminal are coupled by stacking one on the other.

2. A pressure sensor according to claim 1, wherein said electrically connecting means includes a plug/socket electric connection means by which said electric circuit module and said external connection terminal are electrically connected with each other.

3. A pressure sensor according to claim 1, wherein said electrically connecting means includes elastically touch type electric connection means by which said electric circuit module and said external connection terminal are electrically connected with each other.

4. A pressure sensor comprising:
a housing having a pressurized fluid inlet;
a supporting member installed in an inner space of said housing and having one end surface of the pressurized fluid inlet side the other end surface opposite to the one end surface, and a connection port opened at the one end surface and the other end surface;

a pressure sensitive element supported on the one end surface of said supporting member in the inner space of said housing to partition the inner space of said housing into a pressurized sensitive chamber communicating with the pressurized fluid inlet and a sealing chamber isolated from the pressurized fluid inlet;

an electric circuit module supported on the other end surface of said supporting member in the inner space of said housing and electrically connected to said pressure sensitive element through the connection port of said supporting member, said electric circuit module is constructed by a both-side printed circuit board in which electronic parts are mounted on both side surfaces of said circuit board, and said both-side printed circuit board is supported on the other end surface of said supporting member in a state that the electronic parts of one side surface of said circuit board are disposed in the connection port of said supporting member; and an external connection terminal supported on the peripheral wall of said housing, protruded from the inner space of said housing to the outer space and electrically connected to said electric circuit module.

5. A pressure sensor comprising:

a housing having a pressurized fluid inlet;

a supporting member installed in an inner space of said housing and having one end surface of the pressurized fluid inlet side, the other end surface opposite to the one end surface, and a connection port opened at the one end surface and the other end surface;

a pressure sensitive element supported on the one end surface of said supporting member in the inner space of said housing to partition the inner space of said housing into a pressurized sensitive chamber communicating with the pressurized fluid inlet and a sealing chamber isolated from the pressurized fluid inlet;

an electric circuit module supported on the other end surface of said supporting member in the inner space of said housing and electrically connected to said pressure sensitive element through the connection port of said supporting member; and an external connection terminal supported on the peripheral wall of said housing, protruded from the inner space of said housing to the outer space and electrically connected to said electric circuit module; and said housing including a main housing member having the pressurized fluid inlet, and a connector housing member attached to said main housing member and supporting said external connection terminal, and said supporting member, and said pressure sensitive element and said electric circuit module disposed on both side surfaces of said supporting member are held between said main housing member and said connector housing member.

6. A pressure sensor comprising:

a housing having a pressurized fluid inlet;

a supporting member installed in an inner space of said housing and having on the end surface of the pressurized fluid inlet side, the other end surface opposite to the one end surface, and a connection port opened at the one end surface and the other end surface;

a pressure sensitive element supported on the one end surface of said supporting member in the inner space of said housing to partition the inner space of said housing into a pressurized sensitive chamber communicating with the pressurized fluid inlet and a sealing chamber isolated from the pressurized fluid inlet;

an electric circuit module supported on the other end surface of said supporting member in the inner space of said housing and electrically connected to said pressure sensitive element through the connection port of said supporting member; and an external connection terminal supported on the peripheral wall of said housing, protruded from the inner space of said housing to the outer space and electrically connected to said electric circuit module; and a calibration opening, through which said pressure sensitive element of said electric circuit module is calibrated from an outside space, is provided in a region of the peripheral wall of the housing, the region being located in the vicinity of said external terminal and being covered by an outer coupler when said outer coupler is connected to said external connection terminal.

7. A pressure sensor according to claim 6, wherein said calibration opening is closed by a cap composed of a cured rubber-like material.

* * * * *

UNITED STATES PATENT AND TRADEMARK OFFICE
CERTIFICATE OF CORRECTION

PATENT NO. : 5,159,525                    Page 1 of 2
DATED      : October 27, 1992
INVENTOR(S): Kikuo Tate It is certified that error appears in the above-indentified patent and that said Letters Patent is hereby corrected as shown below:

| Column | Line | |
|---|---|---|
| 2 | 24 | After "already" insert --been--. |
| 2 | 25 | Change "is swinged" to --is hinged--. |
| 3 | 42 | Change "a" to --an--. |
| 3 | 49 | Change "prevent" to --prevents--. |
| 3 | 52 | Change "a" (2nd occurrence) to --an-- |
| 3 | 57 | Change "being mulfunctioned" to --mulfunctioning--. |
| 3 | 61 | Change "hard-" to -- harden- --. |
| 4 | 54 | Change "2" to --32--. |
| 4 | 60 | Change "2b" to --32b--. |
| 5 | 2 | Change "is also functioned" to --also functions--. |
| 5 | 10 | Delete "10" and insert --on the--; after "side" change "to" to --of--. |
| 6 | 33 | Delete "20". |
| 7 | 3 | Change "thereof" to --thereby--. |
| 7 | 16 | Change "last" to --end--. |

UNITED STATES PATENT AND TRADEMARK OFFICE
CERTIFICATE OF CORRECTION

PATENT NO. : 5,159,525
DATED : October 27, 1992
INVENTOR(S) : Kikuo Tate

It is certified that error appears in the above-indentified patent and that said Letters Patent is hereby corrected as shown below:

| Column | Line | |
|---|---|---|
| 8 | 6 | After "except" insert --for--. |
| 8 | 60 | After "In" delete "the". |
| 8 | 67 | After "In" delete "the". |
| 10 | 3 | Change "being malfunctioned" to --malfunctioning--. |
| 10 | 24 | Change "ing" to --ings--. |
| 10 | 29 | Change "pressurized" to --pressure--. |
| 11 | 4 | Change "pressurized" to --pressure--. |
| 11 | 37 | Change "pressurized" to --pressure--. |
| 12 | 23 | Change "pressurized" to --pressure--. |

Signed and Sealed this

Sixteenth Day of November, 1993

*Attest:*

BRUCE LEHMAN

*Attesting Officer*   *Commissioner of Patents and Trademarks*